United States Patent [19]

Berge et al.

[11] Patent Number: 5,797,159
[45] Date of Patent: Aug. 25, 1998

[54] MODULAR APPARATUS FOR WASHING AND WIPING A VEHICLE WINDSHIELD

[75] Inventors: Gilles Berge, Rambouillet; Jean-Pierre Eustache, Antony; Jean-Louis Roumegoux, Paris, all of France

[73] Assignee: Valeo Systemes D'Essuyage, La Verriere, France

[21] Appl. No.: 506,858

[22] Filed: Jul. 25, 1995

[30] Foreign Application Priority Data

Jul. 26, 1994 [FR] France .................. 94 09335

[51] Int. Cl.$^6$ .................. B62D 25/08; B60H 1/28
[52] U.S. Cl. .................. 15/250.31; 296/192; 296/197; 296/208; 454/146; 454/158
[58] Field of Search .................. 15/250.001, 250.27, 15/250.3, 250.31; 55/385.3; 96/135, 139; 296/192, 196, 197, 208; 454/146, 149, 158

[56] References Cited

U.S. PATENT DOCUMENTS

| | | | |
|---|---|---|---|
| 1,265,469 | 5/1918 | Mallory | 454/146 |
| 1,624,291 | 4/1927 | Troutman | 454/149 |
| 2,587,197 | 2/1952 | Mousel | 454/149 |
| 2,748,687 | 6/1956 | Ballard | 296/192 |
| 2,975,696 | 3/1961 | Jewell | 296/208 |
| 4,179,153 | 12/1979 | Cole, Jr. | |
| 4,874,198 | 10/1989 | Roller | 296/208 |
| 5,082,078 | 1/1992 | Umeda | 296/192 |
| 5,221,292 | 6/1993 | Aoyama | 55/385.3 |
| 5,368,620 | 11/1994 | Chiba et al. | 55/385.3 |
| 5,370,576 | 12/1994 | Krofchalk | 454/158 |

FOREIGN PATENT DOCUMENTS

| | | | |
|---|---|---|---|
| 0 588 708 | 9/1993 | European Pat. Off. | |
| 704526 | 3/1931 | France . | |
| 2668110 | 4/1992 | France . | |
| 2684950 | 6/1993 | France | 296/197 |
| 3704325 | 8/1988 | Germany . | |
| 40 40 731 | 3/1990 | Germany . | |
| 3929875 | 3/1991 | Germany . | |
| 30888 | 2/1989 | Japan | 296/208 |

OTHER PUBLICATIONS

La Fonction grille d'auvent, 1141 Ingenieurs de l'Automobile (1993) Juin/Juillet, No. 682, Garches FR French Search Report 21 Apr. 1995.

*Primary Examiner*—Terrence Till
*Attorney, Agent, or Firm*—Morgan & Finnegan, LLP

[57] ABSTRACT

A vehicle has a windshield and a hood extending away from the lower edge of the windshield. A modular windshield washing and wiping apparatus, disposed adjacent to the lower edge of the windshield, comprises at least two modules, arranged to be assembled together and to the remainder of the vehicle. One of the modules contains a screen washing liquid so as to act as a reservoir for the latter, while another module carries the screen wiping equipment. One of the modules includes at least one further component which is a component of a ventilating and/or air conditioning apparatus of the vehicle.

4 Claims, 1 Drawing Sheet

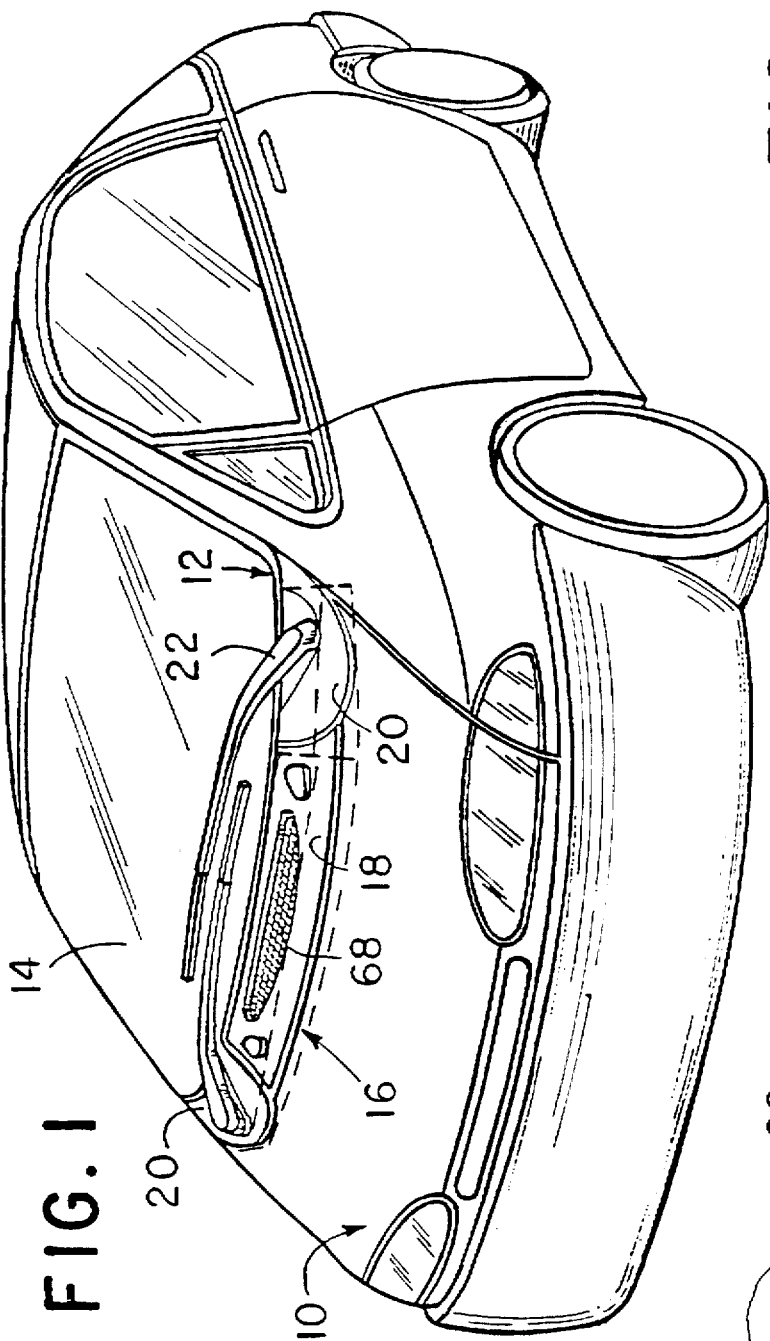
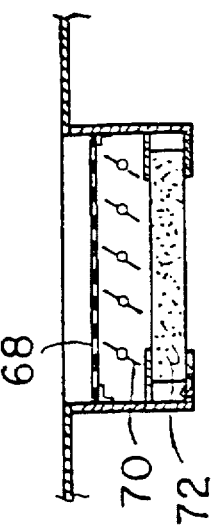
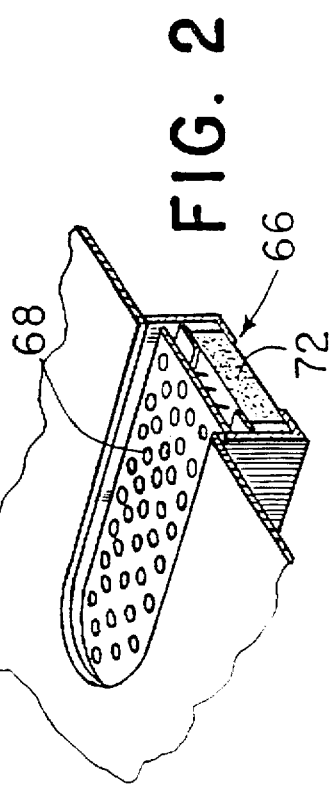

MODULAR APPARATUS FOR WASHING AND WIPING A VEHICLE WINDSHIELD

FIELD OF THE INVENTION

The present invention relates to apparatus for washing and wiping a vehicle windshield, in particular for a motor vehicle which has a hood extending away from the lower edge of the windshield.

BACKGROUND OF THE INVENTION

In such a vehicle, the space which lies between the hood and the lower edge of the windshield is conventionally used for accommodating the windshield wiper system. The same space is also used for admission of fresh air to the interior of the vehicle, which has an air inlet grille overlying this space. The vehicle also has screen washing means for washing the windshield, comprising a screen washing liquid reservoir together with means for spraying this liquid on to the windshield.

Conventionally, the screen washing liquid reservoir is arranged underneath the hood, in the front compartment of the vehicle. During manufacture, the operations of fitting on the vehicle the screen wiping means, the air admission means, the air inlet grille, and the reservoir and spraying components of the screen washing apparatus, are functions which require a considerable amount of time to accomplish. These assembly and fitting operations are not easy to carry out using automatic assembly machinery, and as a result they are particularly expensive.

It has been proposed to provide monobloc, or unitary, screen wiping and washing apparatus, in which the air admission means, the screen washing liquid reservoir, the screen wiping means and the means for directing the washing liquid on to the windshield, are all integrated, with a view to simplifying the operations of fitting these various components in the vehicle, and to make it possible to carry out these operations using automatic means.

It has also been proposed to provide a modular apparatus for wiping and washing the windshield of a vehicle, which avoids the use of monobloc wiping and washing apparatus that has to be specially adapted to a given model of vehicle. To this end, such a known apparatus includes at least one common module which can be used on various types or models of vehicle, thus tending to reduce manufacturing costs and providing the advantage of an economy of scale. More particularly, the modular apparatus comprises at least two modules, which can be assembled together and to the remainder of the vehicle, with one of the two modules being adapted to contain a screen washing liquid, so as to constitute a reservoir for the latter, while the other module acts as a support for the windshield wiping system itself.

An object of the present invention is to propose an improvement to such a design for a modular apparatus, such as to improve the modular character of the apparatus and to extend the advantages that result from the facility for assembling and fitting such an apparatus.

DISCUSSION OF THE INVENTION

According to the invention, a modular apparatus for washing and wiping a vehicle windshield comprises a hood extending away from the lower edge of the windshield, the apparatus being of the type comprising at least two modules arranged for assembly together and to the remainder of the vehicle, with one of the modules being adapted to contain a screen washing liquid so as to constitute a reservoir for the latter, while the other module supports means for wiping the windshield, is characterised in that one of the said modules includes at least one further component which is a component of a ventilating and/or air conditioning apparatus of the vehicle.

Further features and advantages of the invention will appear more clearly from a reading of the detailed description which follows, of preferred embodiments of the invention given by way of example only and with reference to the accompanying drawings.

BRIEF DESCRIPTION OF THE DRAWINGS

FIG. 1 is a diagrammatic perspective view showing a vehicle having a modular apparatus in accordance with the current state of the art.

FIGS. 2 and 3 are detail views showing a modification in accordance with the invention, including elements which form part of a ventilating and/or air conditioning circuit of the vehicle.

DESCRIPTION OF PREFERRED EMBODIMENTS OF THE INVENTION

FIG. 1 shows, diagrammatically and in perspective, a motor vehicle having a hood 10 lying below the level of, and extending forward from, the lower edge 12 of the windshield 14 of the vehicle. The hood 10 is equipped with a modular apparatus 16 for washing and wiping the windshield 14 in accordance with the current state of the art.

In the example shown in FIG. 1, the modular apparatus 16 consists of a module which defines a reservoir 18, together with two screen wiping modules 20.

The reservoir module 18 has an exposed upper face which is generally flat and which forms an extension of the outer surface of the hood 10. This upper face extends longitudinally over part of the width of the vehicle, on either side of a longitudinal plane of symmetry of the bodywork of the vehicle. The reservoir module 18 extends laterally between the hood 10 and the lower edge 12 of the windshield 14.

The screen wiping modules 20 also have an exposed upper face, which again forms an extension of the outer surface of the hood 10. The modules 20 are arranged on either side of the reservoir module 18, of which they form an extension towards the sides of the vehicle. The modules 20 overlie the space that exists between the hood 10 and the lower edge 12 of the windshield 14. Each screen wiping module 20 carries a screen wiper arm 22, of a kind known per se and having at one of its ends means for fastening the arm 22 on a drive spindle (not shown), which is coupled to means for driving the spindle in rotation. The other end of each wiper arm carries a conventional wiper blade which includes a wiping strip for wiping over the windshield 14.

In the embodiment of the present invention which is shown in FIGS. 2 and 3, to which reference is now made, components, generally indicated at 66 in FIG. 2, of the ventilating and/or air conditioning circuit or dust of the vehicle are incorporated with the apparatus, either with the central washing fluid or reservoir module 18, or with the screen wiping modules 20. In this example, and as shown in FIG. 3, these components 66 comprise an upper grille 68, articulated vanes 70, and a filter element 72.

More precisely, in this example, the central module 18 has a central aperture through which air is admitted into a heating and/or air conditioning apparatus of the vehicle. This central aperture comprises the upper grille 68, which is more commonly referred to as an aspiration grille and which prevents the penetration of undesirable objects into the heating and/or air conditioning apparatus. The grille 68 is upstream of the movable vanes 70, which enable the flow of air into the heating and/or air conditioning apparatus to be regulated. The filter 72, which is downstream of the vanes 70, prevents odors and dust from passing into the heating and/or air conditioning apparatus.

What is claimed is:

1. A modular windshield washing and wiping apparatus, for a windshield of a vehicle which includes the windshield, the windshield defining a lower edge thereof, and a hood extending away from the lower edge, the modular apparatus including windshield wiping means and comprising a plurality of modules adapted for assembly together and to the vehicle, one of the modules having a windshield washing liquid reservoir and another module carrying the windshield wiping means, the modular apparatus further including a ventilating duct having a plurality of components, wherein at least two of the components are a set of vanes, the vanes being within said ventilating duct for pivoting movement within said ventilating duct in order to regulate air flow, and an air filter spaced from the vanes and within the duct in order to filter the regulated air flow.

2. Apparatus according to claim 1, wherein one of said components is a grille.

3. Apparatus according to claim 1, wherein the filter is a dust filter.

4. Apparatus according to claim 1, wherein the filter is an odor filter.

* * * * *